US012655956B2

(12) United States Patent
Kumar et al.

(10) Patent No.: US 12,655,956 B2
(45) Date of Patent: Jun. 16, 2026

(54) HEAD LAMPS FOR VEHICLES

(71) Applicant: Rivian IP Holdings, LLC, Irvine, CA (US)

(72) Inventors: Priyank Kumar, Ypsilanti, MI (US); Simon Baker, Basingstoke (GB); Shammika Ashan Wickramasinghe, Banbury (GB); Carlos Montes Relanzon, Trabuco Canyon, CA (US); Timothy Beaven, Bicester (GB); Siobhan Marie Casey, Newport Beach, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 19/000,297

(22) Filed: Dec. 23, 2024

(65) Prior Publication Data

US 2025/0257856 A1 Aug. 14, 2025

Related U.S. Application Data

(60) Provisional application No. 63/553,597, filed on Feb. 14, 2024.

(51) Int. Cl.
*F21S 41/63* (2018.01)
*F21S 41/25* (2018.01)
*F21S 41/29* (2018.01)

(52) U.S. Cl.
CPC ............. *F21S 41/635* (2018.01); *F21S 41/25* (2018.01); *F21S 41/295* (2018.01)

(58) Field of Classification Search
CPC .......... F21S 41/18; F21S 41/25; F21S 41/295; F21S 41/635
See application file for complete search history.

(56) References Cited

U.S. PATENT DOCUMENTS

| | | | | |
|---|---|---|---|---|
| 2017/0089537 | A1* | 3/2017 | Tsuchiya | F21V 5/007 |
| 2017/0136942 | A1* | 5/2017 | Wu | B60Q 1/2607 |
| 2017/0174121 | A1* | 6/2017 | Wasilewski | F21S 43/14 |
| 2018/0043818 | A1* | 2/2018 | Lim | B60Q 1/115 |
| 2022/0009404 | A1* | 1/2022 | Kurebayashi | H05B 45/30 |
| 2023/0371155 | A1* | 11/2023 | Baker | G06V 10/764 |
| 2024/0198889 | A1* | 6/2024 | Jun | F21S 41/47 |

FOREIGN PATENT DOCUMENTS

| | | | | |
|---|---|---|---|---|
| JP | 2015133219 A * | 7/2015 | | B60Q 1/2696 |
| WO | WO-2023223834 A1 * | 11/2023 | | F21S 43/20 |

* cited by examiner

*Primary Examiner* — Zheng Song
(74) *Attorney, Agent, or Firm* — BAKERHOSTETLER

(57) ABSTRACT

A head lamp includes projector modules held by a carrier that is designed to move. The carrier may include a bezel with openings for the projector modules. The openings may receive a lens that covers a projector module. The head lamp may include an additional projector module that surrounds, or at least partially surrounds, the bezel and the aforementioned projector modules. The movement of the carrier and the bezel cause the lenses to move, and the movement of the lenses causes articulation of the respective beams of the projector modules.

18 Claims, 10 Drawing Sheets

HEAD LAMPS FOR VEHICLES

CROSS-REFERENCE TO RELATED APPLICATION(S)

This application claims priority to U.S. Provisional Application No. 63/553,597, filed Feb. 14, 2024, titled "HEAD LAMPS FOR VEHICLES", the disclosure of which is incorporated herein by reference in its entirety.

INTRODUCTION

This application is directed to vehicles, and more particularly, to head lamps of vehicles.

SUMMARY

Head lamps used with vehicles may provide illumination to assist drivers in seeing the road or landscape in front of the vehicle. Head lamps may include one or more projector modules, as well as lenses held in place by a carrier.

In accordance with one or more aspects of the present disclosure, an apparatus is described. The apparatus may include a carrier configured to hold a first projector module, a second projector module, and a third projector module for a vehicle. The carrier including a bezel configured to surround the first projector module, the second projector module, and the third projector module. The carrier may be at least partially surrounded by a fourth projector module. The carrier may include a single-piece carrier and may be configured to be positioned in a head lamp housing, and the fourth projector module at least partially surrounds the bezel, the first projector module, the second projector module, and the third projector module.

The first projector module and the second projector module may combine to provide a first light intensity in a first mode of operation, and the first projector module, the second projector module, and the third projector module may combine to provide a second light intensity in a second mode, the second light intensity greater than the first light intensity. The second projector module may be positioned between the first projector module and the third projector module, and the second projector module may be adjacent to the first projector module and the third projector module.

The apparatus may further include a first lens configured to cover the first projector module; a second lens configured to cover the second projector module; and a third lens configured to cover the third projector module. The carrier may be movable with respect to the fourth projector module, and based on movement of the carrier, the first lens, the second lens, and the third lens are movable relative to the fourth projector module. The fourth projector module may extend around the first projector module, the second projector module, and the third projector module. The carrier may be configured to move in response to a change in ride height of the vehicle.

In accordance with one or more aspects of the present disclosure, a head lamp is described. The head lamp may include a housing configured to receive: a unitary carrier configured to hold a first projector module and a second projector module, and a third projector module that surrounds the first projector and the second projector. The head lamp may further include a transparent cover coupled with the housing. The transparent cover may overlay the unitary carrier and the third projector module. The unitary carrier may be further configured to carry the third projector module. The unitary carrier may be movable with respect to the third projector module, thereby causing movement of the first projector module and the second projector module. Based on the movement of the unitary carrier, the first projector module may include an adaptive driving projector module.

The first projector module may be positioned in a first opening of the unitary carrier, and the first opening may include a first dimension and a second dimension, the second dimension being at least two times greater than the first dimension. The second projector module may be positioned in a second opening of the unitary carrier, and the second opening may include the first dimension and the second dimension. The unitary carrier may include an oblong shape, each of the first opening and the second opening may include a rectangular shape.

The head lamp may further include a bezel surrounded by the third projector module. The first projector module and the second projector module may align with respective openings of the bezel.

In accordance with one or more aspects of the present disclosure, a vehicle is be described. The head lamp may include a head lamp, including: a unitary carrier configured to hold a first projector module, a second projector module, and a third projector module, and a fourth projector module that surrounds the first projector module, the second projector module, and the third projector module. The head lamp may further include a transparent cover that overlays the unitary carrier and the fourth projector module. Based on movement of the unitary carrier, the first projector module, the second projector module, and the third projector module are movable with respect to the fourth projector module.

The unity carrier may be configured to move in response to a change in movement of the vehicle. The first projector module may be positioned in a first opening of the carrier, the first opening may include a first dimension and a second dimension, the second dimension being at least two times greater than the first dimension, the second projector module and the third projector module are positioned in a second opening and a third opening, respectively, of the carrier, and each of the second opening and the third opening may include the first dimension and the second dimension.

BRIEF DESCRIPTION OF THE DRAWINGS

Certain features of the subject technology are set forth in the appended claims. However, for purpose of explanation, several embodiments of the subject technology are set forth in the following figures.

An Appendix is also attached with which one or more implementations of the subject technology may be implemented.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. An Appendix is also attached with which one or more implementations of the subject technology may be implemented. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

This disclosure is directed to lamps, including head lamps, for vehicles. Lamps described herein may include one or more projector modules, or simply projectors, that function as light sources. Depending on the desired light intensity (e.g., low-beam, high beam) or driving mode, the number of projector modules illuminated (e.g., generating light) may vary. The lamp may further include a carrier designed to hold the projector modules, including respective lenses covering the modules. The lamp may include an additional projector module (e.g., stadium projector) that surrounds the aforementioned modules. In one or more implementations, the carrier is movable with respect to the additional projector module, thus allowing for articulation of the respective beams (e.g., light beams), including a beam path of the beams, of the projector modules. The articulation of the beams may function to account for build tolerances of the vehicle assembly and/or to change a beam path (e.g., light beam path) for the projector modules when a ride height of the vehicle is adjusted. Additionally, the beams of the projector modules may be articulated to provide adaptive driving beams to account for a change in movement (e.g., driving direction) of the vehicle. Articulation of the beams may be due in part to movement of lens (held by the carrier) or to movement of the projector modules themselves.

Figure 1:
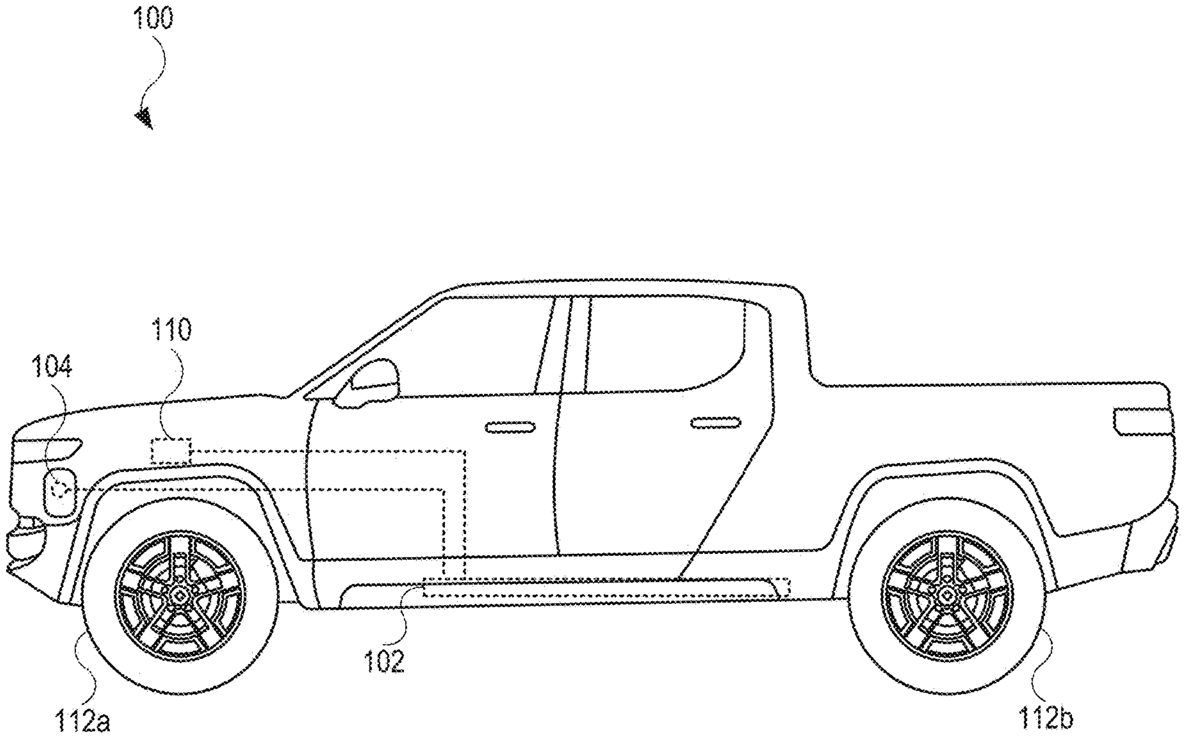
FIG. 1 illustrates a side view of an example of a vehicle, in accordance with one or more aspects of the present disclosure.

FIG. 1 illustrates an example of a vehicle 100, in accordance with aspects of the present disclosure. In one or more implementations, the vehicle 100 is a sport utility vehicle (SUV). In the exemplary implementation shown in FIG. 1, the vehicle 100 is a truck. Generally, the vehicle 100 may take the form of any motorized vehicle, including motorized vehicles with an internal combustion engine and/or one or more electric motors. Accordingly, other implementations of the vehicle 100 may include land-based vehicles, such as a car (e.g., sedan, hatchback), a van, or a commercial truck, as non-limiting examples.

The vehicle 100 may include a battery pack 102. The battery pack 102 may be coupled (e.g., electrically coupled) to one or more electrical systems of the vehicle 100 to provide power to the one or more electrical systems. The vehicle 100 may further include a port 104 (e.g., charge port) designed to receive a cable connector (not shown in FIG. 1) used to transmit power (e.g., alternating current (AC) power) that is converted to direct current (DC) power to charge the battery pack 102. The battery pack 102 may couple (e.g., electrically couple) to a drive unit 110, representative of one or more drive units of the vehicle 100. While the drive unit 110 is shown as generally being in the front of the vehicle 100, the drive unit 110 may be located in the rear of the vehicle 100. When multiple drives units are implemented in the vehicle 100, at least one drive may be located in the front of the vehicle 100 and at least one drive unit may be located in the rear of the vehicle 100. Further, when multiple drive units are used, at least one drive unit may be in the front of the vehicle to drive the front wheels (e.g., wheel 112*a*), and at least one drive unit may be in the rear of the vehicle to drive the rear wheels (e.g., wheel 112*b*). The drive unit 110 may include, for example, a motor, an inverter, a gear box, and a differential. In the example shown in FIG. 1, the drive unit 110 takes the form of an electric motor. In this regard, the drive unit 110 may use energy (e.g., electrical energy) stored in the battery pack 102 for propulsion in order to drive (e.g., rotationally drive) wheels of the vehicle 100, thus causing movement of the vehicle 100.

Figure 2:
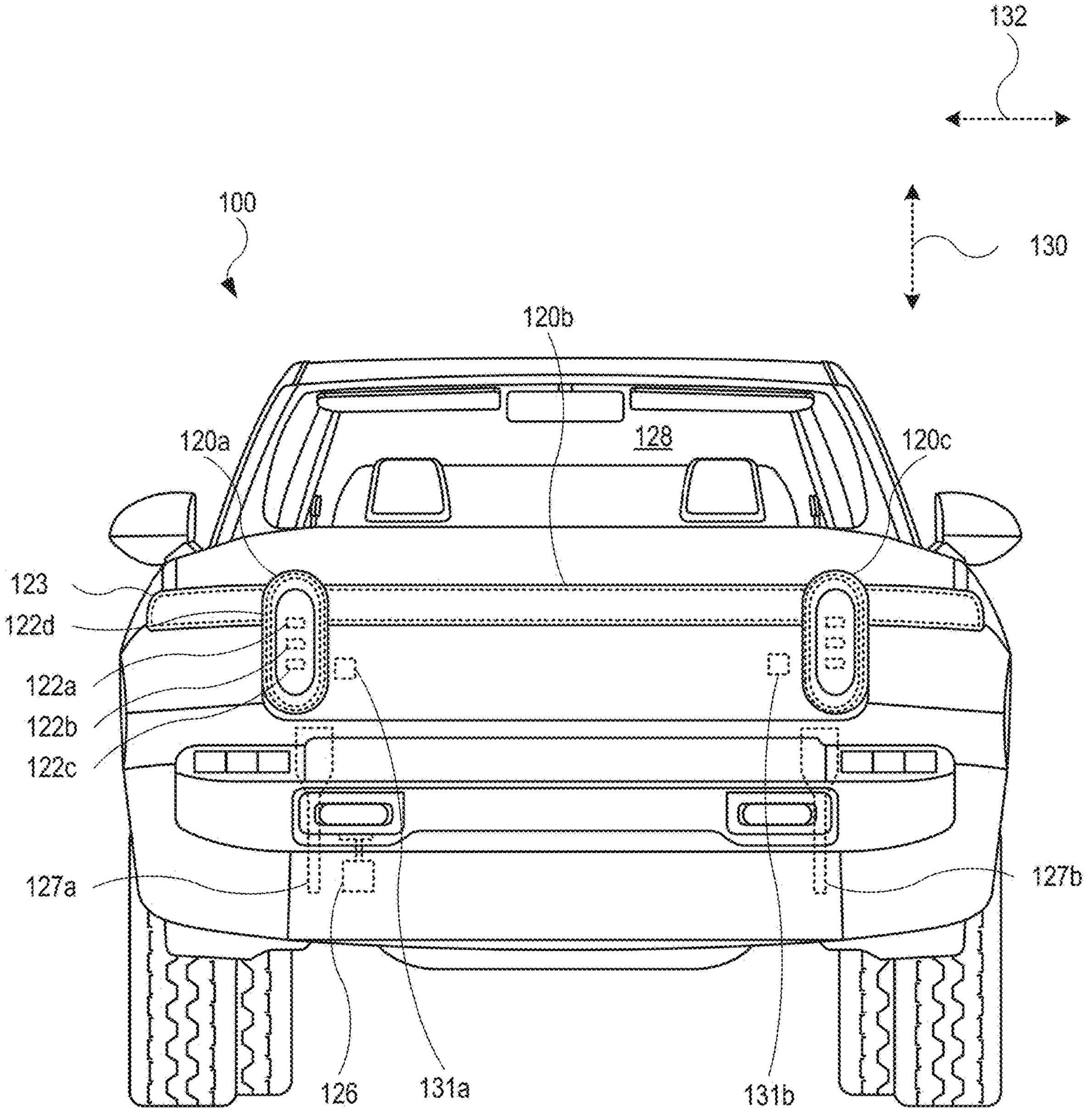
FIG. 2 illustrates a front view of a vehicle, in accordance with one or more aspects of the present disclosure.

FIG. 2 illustrates a front view of the vehicle 100, in accordance with one or more aspects of the present disclosure. The vehicle 100 may include several lamps. For example, in one or more implementations, the vehicle 100 includes a lamp 120*a*, a lamp 120*b*, and a lamp 120*c*. Each of the lamps 120*a*, 120*b*, and 120*c* may include one or more projector modules, or projectors, that provide one or more lights sources designed to illuminate and increase visibility for passengers in a cabin 128 of the vehicle 100. For example, the lamp 120*a* (representative of the lamp 120*c*) includes a projector module 122*a*, a projector module, 122*b*, and a projector module 122*c*. Additionally, the lamp 120*a* may further include a projector module 122*d* that surrounds, or at least partially surrounds, the projector modules 122*a*, 122*b*, and 122*c*. The lamp 120*a* may further include an extended portion 123, or extension, that provides an additional projector module. Also, the lamp 120*b* may include a projector module (shown, not labeled). Projector modules shown and/or described herein may take the form of an LED or an incandescent bulb, as non-limiting examples. The lamps 120*a* and 120*c* may be referred to as head lights or head lamps, and the lamp 120*b* may be referred to as a center lamp. The vehicle 100 may further include a power supply, such as a battery pack 102 (shown in FIG. 1), that provides energy (e.g., electrical energy) to illuminate the projector modules 122*a*, 122*b*, 122*c*, and 122*d*, as well as other projector modules shown and/or described in FIG. 2. However, in one or more implementations, the vehicle 100 includes a separate power source (e.g., 12-Volt battery) to illuminate the aforementioned projector modules.

Additionally, the vehicle 100 may include a sensor 126. In one or more implementations, the sensor 126 takes the form of a ride height sensor. Accordingly, the sensor 126 may determine a current height (e.g., current ride height) of the vehicle 100 and a change in height of the vehicle 100 relative to, for example, a road or surface on which the vehicle 100 is located. As shown, the sensor 126 is located at, or generally at, a front end of the vehicle 100. Although not shown, the vehicle 100 may further include a sensor located at, or generally at, a front end of the vehicle 100, with the sensor including any features and/or characteristics described for the sensor 126.

The vehicle 100 may include a suspension system, shown as including a suspension unit 127*a* and a suspension unit 127*b* (each representative of one or more additional suspension units), that is capable of adjusting regions of the vehicle 100, such as the cabin 128 (e.g., space for passengers) and/or a chassis (not shown in FIG. 2) of the vehicle 100, in either of two directions indicated by the two-sided arrow 130. In one or more implementations, each of the suspension units 127*a* and 127*b* takes the form of an air suspension unit or air ride suspension unit, and the suspension system takes the form of an air suspension system. Conversely, in one or more implementations, each of the suspension units 127*a* and 127*b* takes the form of a shock and strut system, and the suspension system takes the form of a standard suspension system.

When the vehicle 100 is moved in either direction of the two-sided arrow 130, the sensor 126 determines the current height of the vehicle 100. When the suspension system takes the form of an air suspension system, the lamps 120*a* and 120*b*, including their respective projector modules, may automatically articulate and re-level in response to a change in ride height. Conversely, when the suspension system takes the form of a standard suspension system, the vehicle 100 may use the information (e.g., current height data) provided by the sensor 126 to articulate at least some beams (e.g., light beams) from the respective projector modules of the lamps 120*a* and 120*b*, thus causing a change in direction (e.g., angular direction) of emitted lights from the respective beams. For example, the vehicle 100 may articulate the respective beams the projector modules 122*a*, 122*b*, and 122*c* based on the current ride height (along the two-sided arrow 130) of the vehicle 100. In this regard, the vehicle may include a motor 131*a* and a motor 131*b* designed to articulate the lamp 120*a* and the lamp 120*b*, respectively, thus causing a change in direction (e.g., angular direction) of emitted lights from the respective beams of the lamps 120*a* and 120*b*. As non-limiting examples, each of the motors 131*a* and 131*b* may take the form of a DC motor, including a stepper motor or servo motor. The degree or angle at which projector modules 122*a*, 122*b*, and 122*c* project light may vary based upon the ride height of the vehicle 100. In this regard, when the height of the vehicle increases, the projector modules 122*a*, 122*b*, and 122*c* may be tilted lower (e.g., decreased angle) and conversely, when the height of the vehicle decreases, the projector modules 122*a*, 122*b*, and 122*c* may be tilted higher (e.g., increased angle). Additionally, the sensor 126, when implemented as a ride height sensor, may be used by the vehicle 100 adjust the ride height of the vehicle 100 while the vehicle 100 is in operation. For example, the vehicle 100 may lower the ride height when the vehicle 100 reaches or exceeds a predetermined speed (e.g., 65 miles per hour). The sensor 126 may be used as an input to the vehicle 100 to determine the current ride height of the vehicle 100, which may be subsequently used by the vehicle 100 to articulate the respective beams the projector modules 122*a*, 122*b*, and 122*c*.

Moreover, the vehicle 100 may include additional sensors and/or additional received data that determines movement (e.g., direction of travel) of the vehicle 100. As a result, the vehicle 100 may articulate the respective beams of the projector modules 122*a*, 122*b*, and 122*c* in either direction of the two-sided arrow 132. As an example, when the vehicle 100 turns left or right, the respective beams of the projector modules 122*a*, 122*b*, and 122*c* may be adjusted to the left or right, respectively, thus providing adaptive driving beams that adjust to the surface on which the vehicle 100 is traveling to be better illuminate the surface in front of the vehicle 100. Further, mode of operation of the vehicle 100 may change based on a change to the driving mode, with exemplary drive modes including, but not limited to, on-road, off-road, all-purpose, conservative, sport, and snow modes. Based on the selected drive mode for the vehicle 100, the vehicle 100 may articulate the respective light beams of the projector modules 122*a*, 122*b*, and 122*c* for the selected driving mode.

Figure 3:
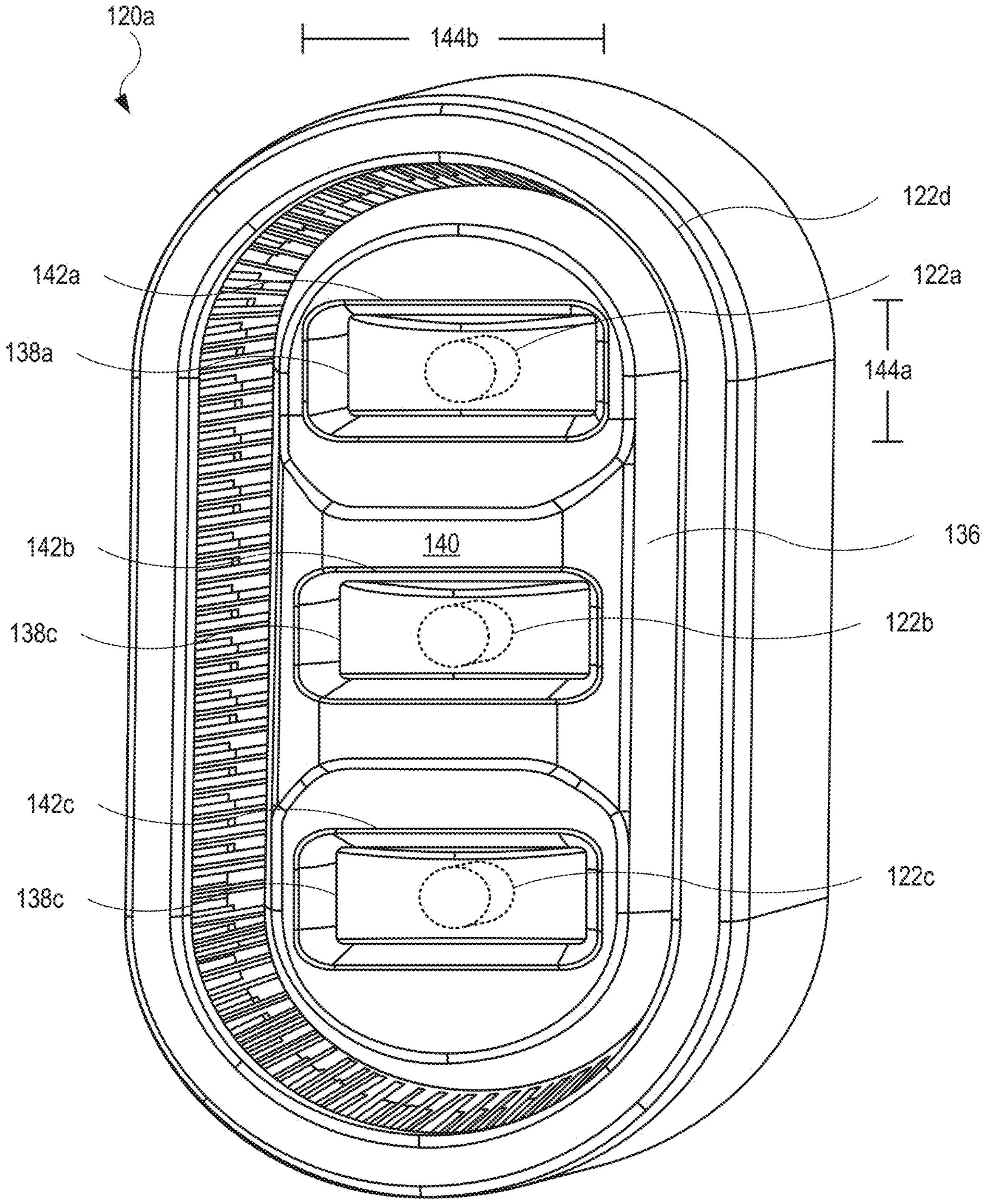
FIG. 3 illustrates a perspective view of a lamp, in accordance with one or more aspects of the present disclosure.

FIG. 3 illustrates a perspective view of the lamp 120*a*, in accordance with one or more aspects of the present disclosure. The lamp 120*a* may be referred to an apparatus. Accordingly, an apparatus described herein may be implemented in a vehicle (e.g., vehicle 100 shown in FIG. 2). For purposes of simplicity, the extended portion 123 (shown in FIG. 2) of the lamp 120*a* is not illustrated. The lamp 120*a* may include a carrier 136 designed to hold several components of the lamp 120*a*. In one or more implementations, the carrier 136 takes the form of a unitary carrier. For example, the carrier 136 may include a single-piece carrier formed from a molded material (e.g., molded plastic material) and taking the form of a unitary carrier. The carrier 136 may hold, or at least provide a space for, the projector modules 122*a*, 122*b*, and 122*c*. Additionally, the carrier 136 may hold a lens 138*a*, a lens 138*b*, and a lens 138*c*. Each of the lenses 138*a*, 138*b*, and 138*c* may include a transparent material, such as a transparent plastic. As shown, the lens 138*a*, the lens 138*b*, and the lens 138*c* cover the projector module 122*a*, the projector module 122*b*, and the projector module 122*c*, respectively.

One or more of the projector modules 122*a*, 122*b*, and 122*c* may illuminate and provide a light beam. Further, the projector modules 122*a*, 122*b*, and 122*c* may illuminate based upon a mode of operation of the vehicle 100 (shown in FIG. 2). For example, each of the projector modules 122*a* and 122*b* may illuminate to provide a low-beam mode for the vehicle 100 that provide a light intensity in accordance with the illumination of the projector modules 122*a* and 122*b*. Alternatively, each of the projector modules 122*a*, 122*b*, and 122*c* may illuminate to provide a high-beam mode for the vehicle 100 that provide a light intensity in accordance with the illumination of the projector modules 122*a*, 122*b*, and 122*c*, with the high-beam mode providing a greater light intensity than that of the low-beam mode. In one or more implementations, the projector module 122*d* is illuminated independently with respect to the illumination of the projector modules 122*a*, 122*b*, and 122*c*.

The carrier 136 may include a bezel 140. Each of the projector modules 122*a*, 122*b*, and 122*c* and each of the lenses 138*a*, 138*b*, and 138*c* may align with a respective opening of the bezel 140. For example, the bezel 140 may include an opening 142*a*, an opening 142*b*, and opening 142*c*. As shown, the projector module 122*a* and the lens 138*a* align with the opening 142*a*, the projector module 122*b* and the lens 138*b* align with the opening 142*b*, and the projector module 122*c* and the lens 138*c* align with the opening 142*c*. Further, the lens 138*a*, the lens 138*b*, and the lens 138*c* may protrude, or at least partially protrude, through the opening 142*a*, the opening 142*b*, and the opening 142*c*, respectively. In this regard, the carrier 136, including the bezel 140, is designed to carry at least the lenses 138*a*, 138*b*, and 138*c*.

As shown, the openings 142*a*, 142*b*, and 142*c* may include a rectangular shape. In this regard, the opening 142*a* (representative of the openings 142*b* and 142*c*) may include a dimension 144*a* (e.g., height) and a dimension 144*b* (e.g., width). In one or more implementations, the dimension 144*a* (e.g., height) is approximately in the range of 15 to 30 millimeters (mm) and the dimension 144*b* is approximately in the range of 55 to 70 mm. The dimension 144*a* may be 20 mm and the dimension 144*b* may be 50 mm. Accordingly, the dimension 144*b* may be at least two times greater than the dimension 144*a*.

Based on the dimension 144*a* of the opening 142*a*, the corresponding dimension (e.g., height) of the lens 138*a* (located in the opening 142*a*) may not be greater than the dimension 144*a*. Moreover, in order to ensure the lens 138*a* fits into the opening 142*a*, the corresponding dimension of the lens 138*a* may be smaller than the dimension 144*a*. Reducing lens height may reduce light out from an optical system (e.g., projector module 122*a*), which leads to loss of beam reach and width (e.g., light beam reach and width from the projector module 122*a*). In order counter the loss of beam reach and width and to achieve or exceed an acceptable safety score from rating institutions, the source lumens in the projector modules (e.g., projector module 122*a*) may be increased. Accordingly, the percent increase in source lumens may be inversely proportional to lens height.

Figure 4:
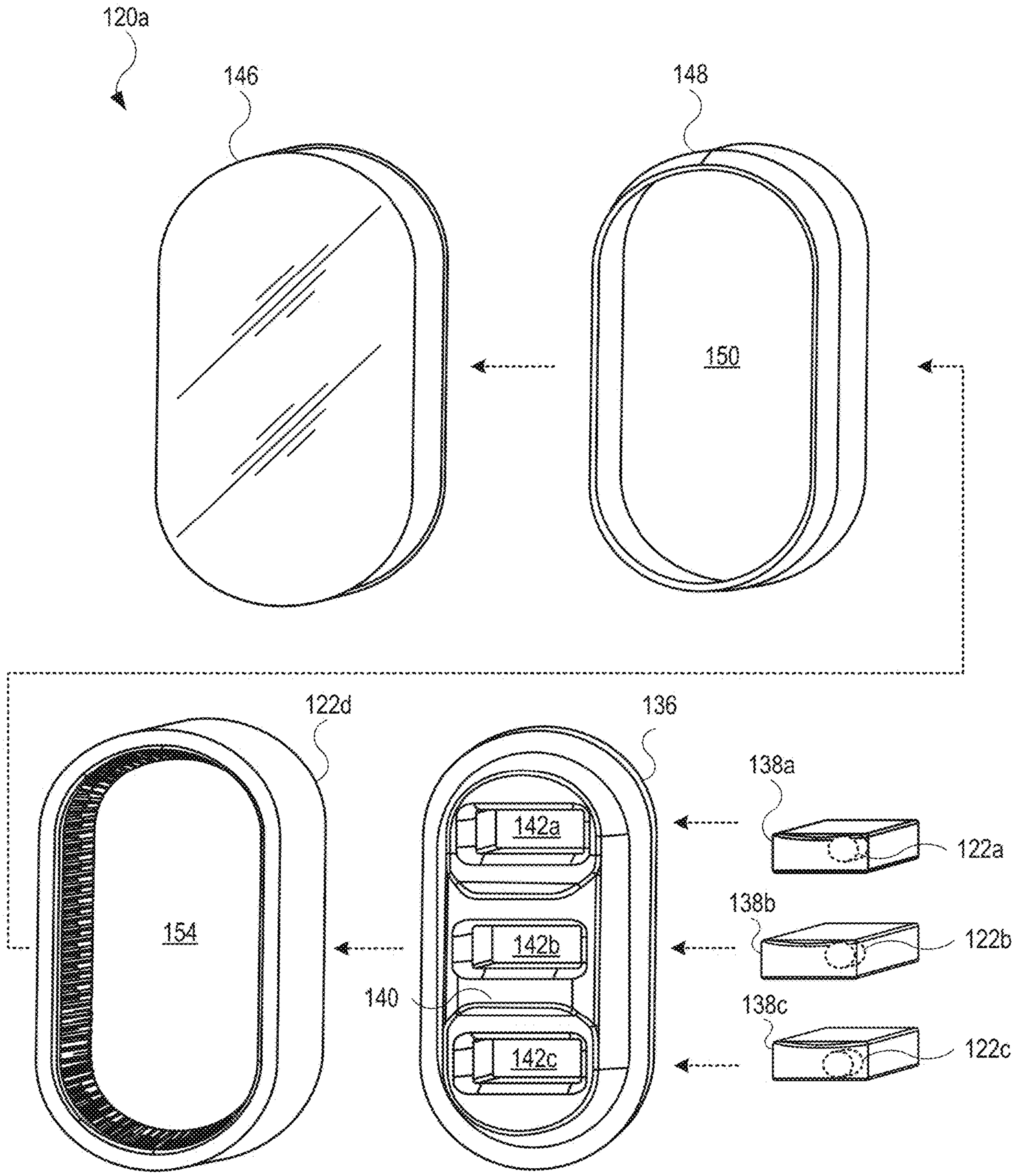
FIG. 4 illustrates an exploded view of a lamp, in accordance with one or more aspects of the present disclosure.

FIG. 4 illustrates an exploded view of the lamp 120*a*, in accordance with one or more aspects of the present disclosure. The lamp 120*a* may include a cover 146. In one or more implementations, the cover 146 takes the form of a transparent cover, and may be formed from glass, transparent plastic, or a combination thereof, as non-limiting examples. The lamp 120*a* may further include a housing 148. The housing 148 may include one or more opaque materials, such as a metal(s), opaque plastic, or a combination thereof, as non-limiting examples. In one or more implementations, each of the cover 146 and projector module 122*d* connects, or mates, with the housing 148. When the lamp 120*a* is assembled, the cover 146 may overlay the housing 148. Further, the housing 148 may define a space 150 to receive the carrier 136 (including the bezel), the projector modules 122*a*, 122*b*, and 122*c*, and the lenses 138*a*, 138*b*, and 138*c*. In this regard, the cover 146 may overlay the projector modules 122*a*, 122*b*, and 122*c*, the carrier 136, and the lenses 138*a*, 138*b*, and 138*c*.

Also, the projector module 122*a* may be adjacent to the projector module 122*b*, and the projector module 122*b* may be adjacent to the projector module 122*c*. Two components or structures may be “adjacent” to each other when there is no intervening component or structure, respectively. Further, the lens 138*a* may be adjacent to the lens 138*b*, and the lens 138*b* may be adjacent to the lens 138*c*. Also, the opening 142*a* may be adjacent to the opening 142*b*, and the opening 142*b* may be adjacent to the opening 142*c*.

The projector module 122*d* may include an oblong shape, resembling a stadium. In this regard, the projector module 122*d* may be referred to as a stadium projector module or a stadium projector. Based on the shape, the projector module 122*d* may include a space 154, or volume, that provides a location for the carrier 136 and the bezel 140. Accordingly, the projector module 122*d* may define a space (e.g., the space 154) for at least the bezel 140. Also, the carrier 136 and the bezel 140 may each include a shape corresponding to that of the projector module 122*d*. In this regard, the carrier 136 and the bezel 140 may each include an oblong shape. Further, when the lens 138*a*, the lens 138*b*, and the lens 138*c* are positioned in the opening 142*a*, the opening 142*b*, and the opening 142*c*, respectively, of the bezel 140, the projector modules 122*a*, 122*b*, and 122*c* are held by the carrier 136, and the carrier 136 (including the bezel 140) is disposed in the space 154, the projector module 122*d* also provides a space (e.g., the space 154) for the projector modules 122*a*, 122*b*, and 122*c*, and the lenses 138*a*, 138*b*, and 138*c*. Also, when the lamp 120*a* is assembled, the carrier 136 (including the bezel 140), the projector modules 122*a*, 122*b*, and 122*c*, and the lenses 138*a*, 138*b*, and 138*c* may be disposed, or at least partially disposed within a space 150 defined by the housing 148.

Figure 5:
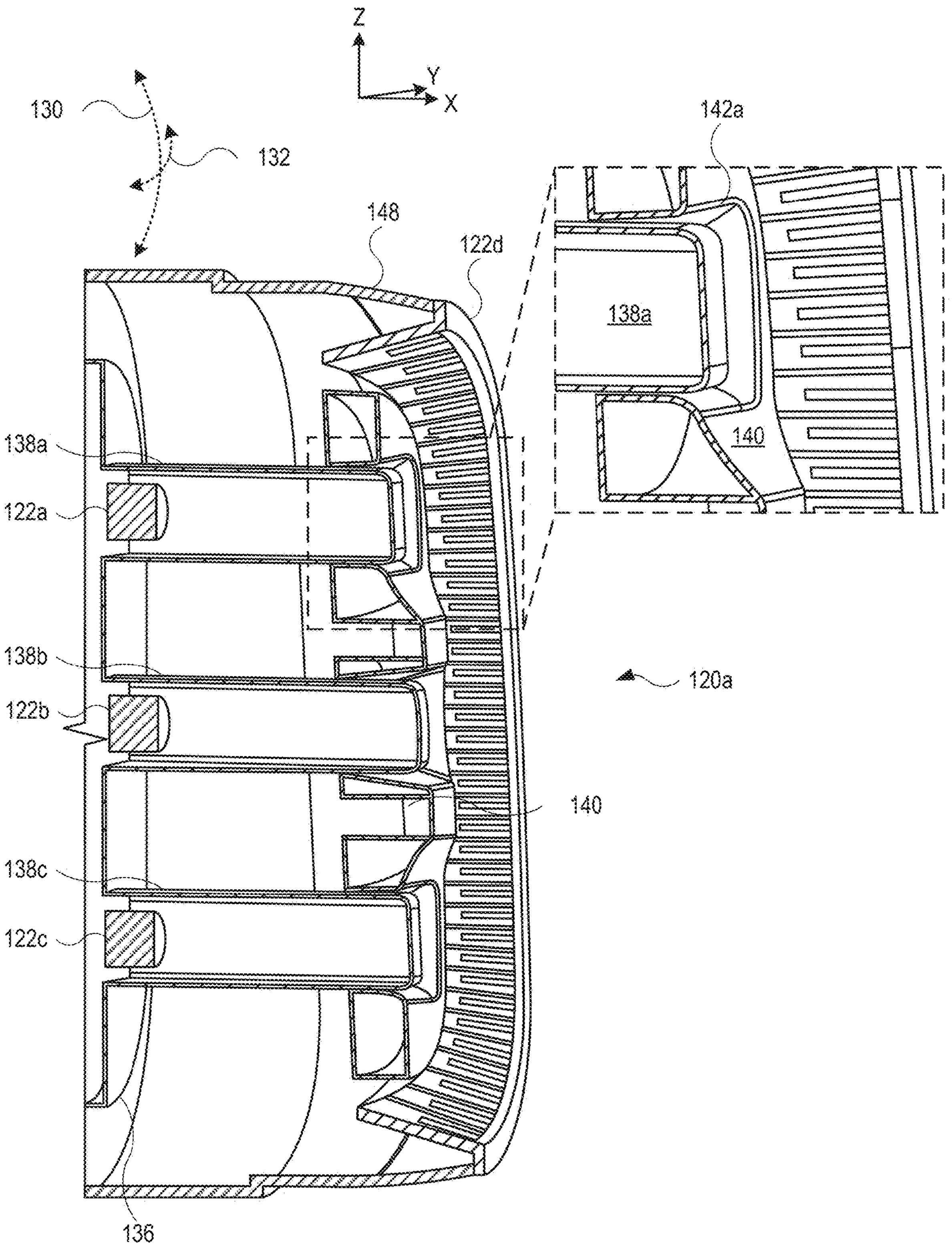
FIG. 5 illustrates a partial cross sectional view of a lamp, in accordance with one or more aspects of the present disclosure.

FIG. 5 illustrates a partial cross sectional view of the lamp 120*a*, in accordance with one or more aspects of the present disclosure. For purposes of simplicity and illustration, the cover 146 (shown in FIG. 4) is removed. The lenses 138*a*, 138*b*, and 138*b* may protrude, or at least partially protrude, through the openings 142*a*, 142*b*, and 142*c*, respectively. For example, as shown in the enlarged view, the lens 138*a* protrudes through the opening 142*a*. However, as further shown, the lens 138*a* may be positioned sub-flush with respect an outer surface of the opening 142*a* (e.g., along a face or surface of the bezel 140). The relationship between the lens 138*a* and the opening 142*a* may represent respective relationships between the lens 138*b* and the opening 142*b*, as well as between the lens 138*c* and the opening 142*c*.

In order to articulate the respective beam paths of the projector modules 122*a*, 122*b*, and 122*c*, the carrier 136 may be configured to move. For example, the carrier 136, including the bezel 140, may move in either direction of the two-sided arrow 130 (e.g., about the X-axis of Cartesian coordinates). The movement of the carrier 136 along either direction of the two-sided arrow 130 may cause a corresponding movement of the lenses 138*a*, 138*b* and 138*c*, thus causing the respective beam paths of the projector modules 122*a*, 122*b*, and 122*c* to change. As non-limiting examples, the movement of the carrier 136 may be used to adjust for build tolerances during vehicle assembly, a change in ride height of the vehicle 100 (not shown in FIG. 5), or a change in the mode of operation (e.g., drive mode) of the vehicle 100. Additionally, the carrier 136, including the bezel 140, may move in either direction of the two-sided arrow 132 (e.g., about the Z-axis). The movement of the carrier 136 along either direction of the two-sided arrow 132 may cause a corresponding movement of the lenses 138*a*, 138*b* and 138*c*, thus articulating the beam path of the projector modules 122*a*, 122*b*, and 122*c* and causing the beam path to move in a corresponding direction. As non-limiting examples, in response to movement of the vehicle 100, the carrier 136 may move. The movement of the carrier 136 may be used to adjust the beam path for the projector modules 122*a*, 122*b*, and 122*c* for adaptive driving beams. In this regard, each of the projector modules 122*a*, 122*b*, and 122*c* may be referred to as an adaptive driving projector module.

The projector module 122*d* may couple with the housing 148. In order articulate the respective beam paths of the projector modules 122*a*, 122*b*, and 122*c*, the carrier 136 (including the bezel 140) and the lenses 138*a*, 138*b*, and 138*c* may move with respect to, or independently, of the projector module 122*d*. Also, in one or more implementations, based on the articulation of the beam path of the projector modules 122*a*, 122*b*, and 122*c*, by movement of the lenses 138*a*, 138*b*, and 138*c*, respectively, and the carrier 136 (including the bezel 140), the projector modules 122*a*, 122*b*, and 122*c* may remain stationary. However, in one or more implementations, the projector modules 122*a*, 122*b*, and 122*c* themselves move based on movement of the carrier 136 (including the bezel 140) and the lenses 138*a*, 138*b*, and 138*c*. In this regard, the projector modules 122*a*, 122*b*, and 122*c* may move relative to the projector module 122*d*.

Figure 6A:
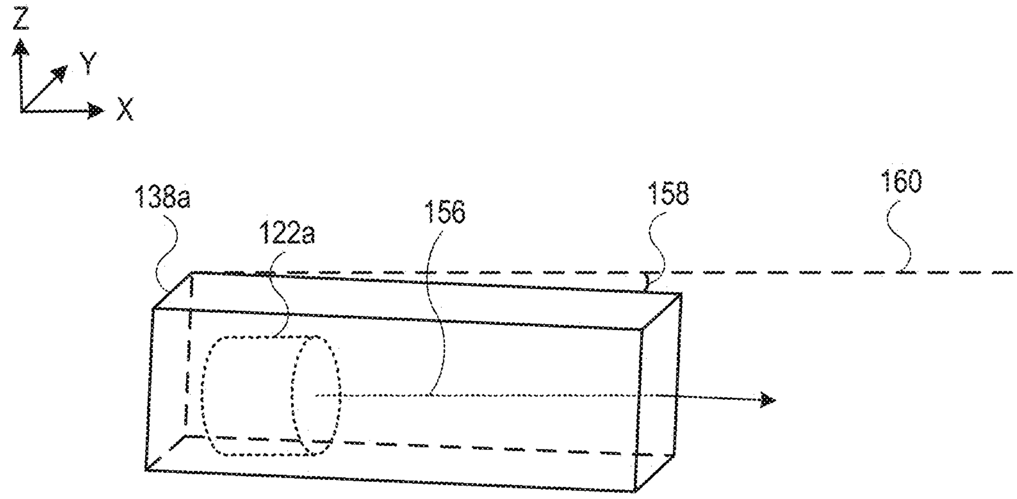
FIG. 6A and FIG. 6B illustrate perspective views of a projector module and a lens, showing articulation of a beam of the projector module based on movement of the lens, in accordance with one or more aspects of the present disclosure.
Figure 6B:
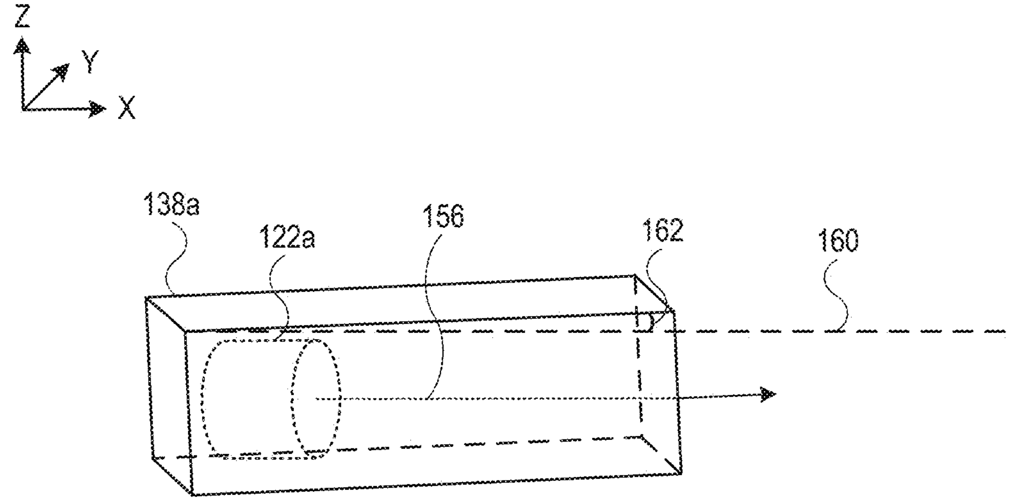

FIG. 6A and FIG. 6B illustrate perspective views of the projector module 122*a* and the lens 138*a*, showing articulation of a beam 156 (e.g., light beam) of the projector module 122*a* based on movement of the lens 138*a*, in accordance with one or more aspects of the present disclosure. The example implementations shown and described in FIGS. 6A and 6B illustrate the lens 138*a* moving relative to the projector module 122*a* to articulate the beam 156 generated by the projector module 122*a*. It should be noted that the relationship between the projector module 122*a* and the lens 138*a* shown in FIGS. 6A and 6B may be representative of other pairs of projector modules and lenses shown and/or described herein.

Referring to FIG. 6A, the lens 138*a* is moved by an angle 158. The angle 158 may be approximately in the range of 3 to 15 degrees with respect to a horizontal line 160. Based on the movement of the lens 138*a* to the angle 158, the beam 156 may be articulated by an angle equal to the angle 158. As shown in FIG. 6A, the beam 156 is articulated downward (e.g., negatively along the Z-axis).

Referring to FIG. 6B, the lens 138*a* is moved by an angle 162. Similar to the angle 158, the angle 162 may be approximately in the range of 3 to 15 degrees with respect to the horizontal line 160. Based on the movement of the lens 138*a* to the angle 162, the beam 156 may be articulated by an angle equal to the angle 162. As shown in FIG. 6B, the beam 156 is articulated upward (e.g., positively along the Z-axis).

Figure 7:
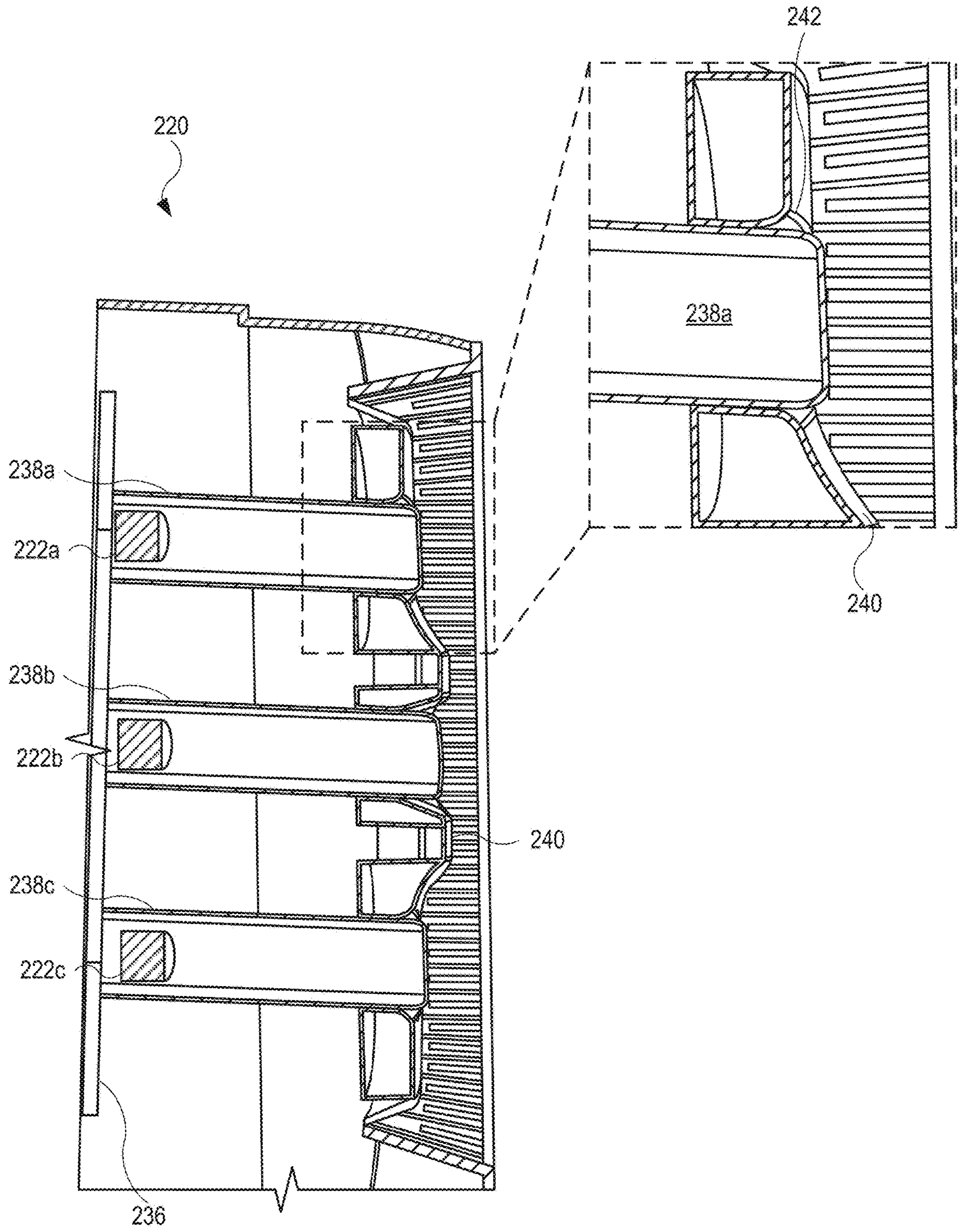
FIG. 7 illustrates a partial cross sectional view of an additional, alternate example of a head lamp, in accordance with one or more aspects of the present disclosure.

FIG. 7 illustrates a partial cross sectional view of an alternate example of a lamp 220, in accordance with one or more aspects of the present disclosure. The lamp 220 may include any components and associated features shown and/or described for the lamp 120*a* (shown in FIGS. 2-5). For example, the lamp 220 may include a projector module 222*a*, a projector module 222*b*, and a projector module 222*c* covered by a lens 238*a*, a lens 238*b*, and a lens 238*c*, respectively. The lamp 220 may further include a carrier 236, with the carrier 236 having a bezel 240. The lenses 238*a*, 238*b*, and 238*b* may protrude through respective openings of the bezel 240. For example, as shown in the enlarged view, the lens 238*a* protrudes through an opening 242 of the bezel. Moreover, the lens 238*a* may protrude beyond an outer surface of the opening 242 of the bezel 240 (e.g., along a face of the bezel 240). The relationship between the lens 238*a* and the opening 242 may represent respective relationships between the lenses 238*b* and 238*c* and respective openings (shown, not labeled) of the bezel 240. Additionally, the respective beam paths of the projector modules 222*a*, 222*b*, and 222*c* may be articulated by any manner shown and/or described herein.

Figure 8:
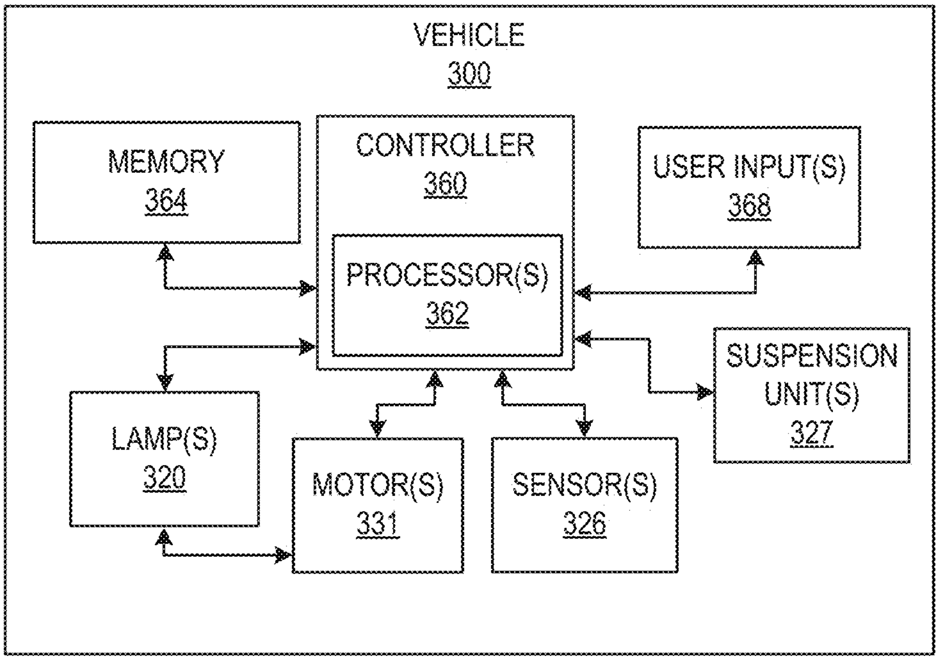
FIG. 8 illustrates a block diagram of a vehicle, in accordance with aspects of the present disclosure.

FIG. 8 illustrates a block diagram of a vehicle 300, in accordance with aspects of the present disclosure. The vehicle 100 (shown in FIG. 1) may include any features shown and/or described herein for the vehicle 300. The vehicle 300 may include a controller 360. In one or more implementations, the controller 360 includes one or more processors 362. The one or more processors 362 may include processing circuitry, such as a central processing unit (CPU), a graphics processing unit (GPU), one or more microcontrollers, one or more micro-electromechanical systems (MEMS) controllers, an application specific integrated circuit (ASIC), an electronic control unit (ECU), or a combination thereof, as non-limiting examples. Additionally, the vehicle 300 may further include memory 364 that stores instructions and/or code, each of which being executable by the one or more processors 362. The memory 364 may include read-only memory (ROM) and or random access memory (RAM).

The vehicle 300 may further include one or more lamps 320. The one or more lamps 320 may take the form of one or more head lamps. In this regard, the one or more lamps 320 may include several projector modules designed to provide a light source. The vehicle 300 may further include one or more sensors 326. As a non-limiting example, the one or more sensors 326 may include a ride height sensor that provide data, to the controller 360, corresponding to a current ride height of the vehicle 300 (including, for example, a cabin of the vehicle 300). Additionally, the one or more sensors 326 may include a proximity sensor (e.g., capacitive sensor, photoelectric sensor) designed to determine a position of a carrier (e.g., carrier 136 shown in FIG. 4) and a bezel (e.g., bezel 140 shown in FIG. 4) that holds the projector modules of the one or more lamps 320. The one or more sensors 326 may further include wheel sensors (e.g., proximity sensors) designed to determine a direction of the wheels (e.g., wheels 112*a* and 112*b* shown in FIG. 1). The one or more sensors 326, when including wheel sensors, can provide data to the controller 360 indicating the wheels are turning, thus indicating the vehicle 300 is turning. In this regard, current movement (including a current direction of travel of the vehicle 300) may be determined using the one or more sensors 326, and the current movement may be used to articulate the respective beams of the projector modules of the one or more lamps 320 and provide adaptive driving beams.

The vehicle 300 may further include one or more suspension units 327 that form in part a suspension system. As non-limiting example, the one or more suspension units 327 may form in part an air suspension system or a standard suspension system. When the one or more suspension units 327 form in part an air suspension system, the controller 360 may provide information (e.g., commands) to the one or more suspension units 327 to adjust the ride height of the vehicle 300.

The vehicle 300 may further include one or more motors 331. As non-limiting examples, the one or more motors 331 may include one or more DC motors, including stepper motors, servo motors, or the like. In one or more implementations, the one or more motors 331 receive a command from the controller 360 to adjust a position of the carriers and bezels, thus adjusting the position of a lens and articulating the respective beams of the projector modules of the one or more lamps 320. The controller 360 may use the data from the one or more sensors 326 to generate the command to the one or more motors 331 and cause the one or more motors to actuate the carrier(s), thus articulating the respective beams of at least some of the projector modules of the one or more lamps 320.

The vehicle 300 may further include one or more user inputs 368. As a non-limiting example, the one or more user inputs 368 may include a display, including a touch input display (e.g., capacitive touch input display). The one or more user inputs 368, when implemented as a display, may provide a user interface for passengers to select a drive mode or a ride height, as non-limiting examples.

Figure 9:
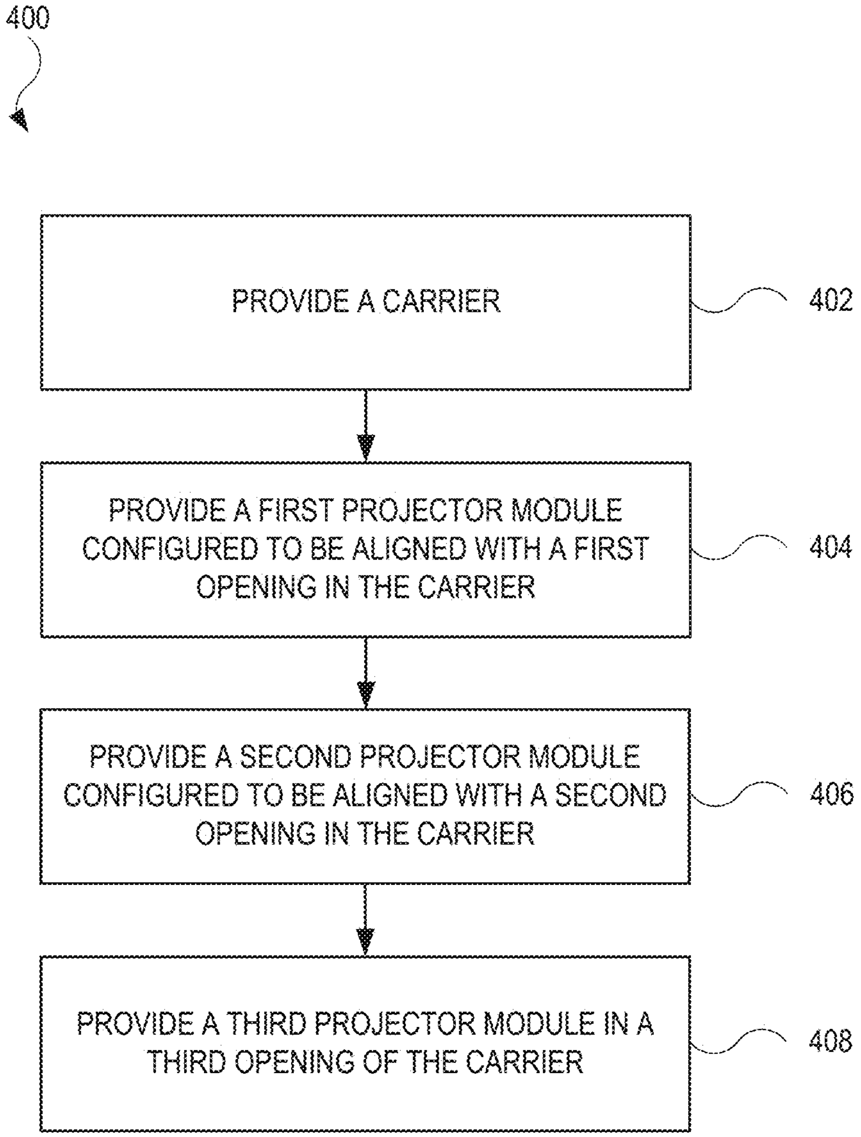
FIG. 9 and FIG. 10 illustrate flow diagrams showing exemplary processes that may be performed for assembling a head lamp, in accordance with one or more aspects of the present disclosure.
Figure 10:
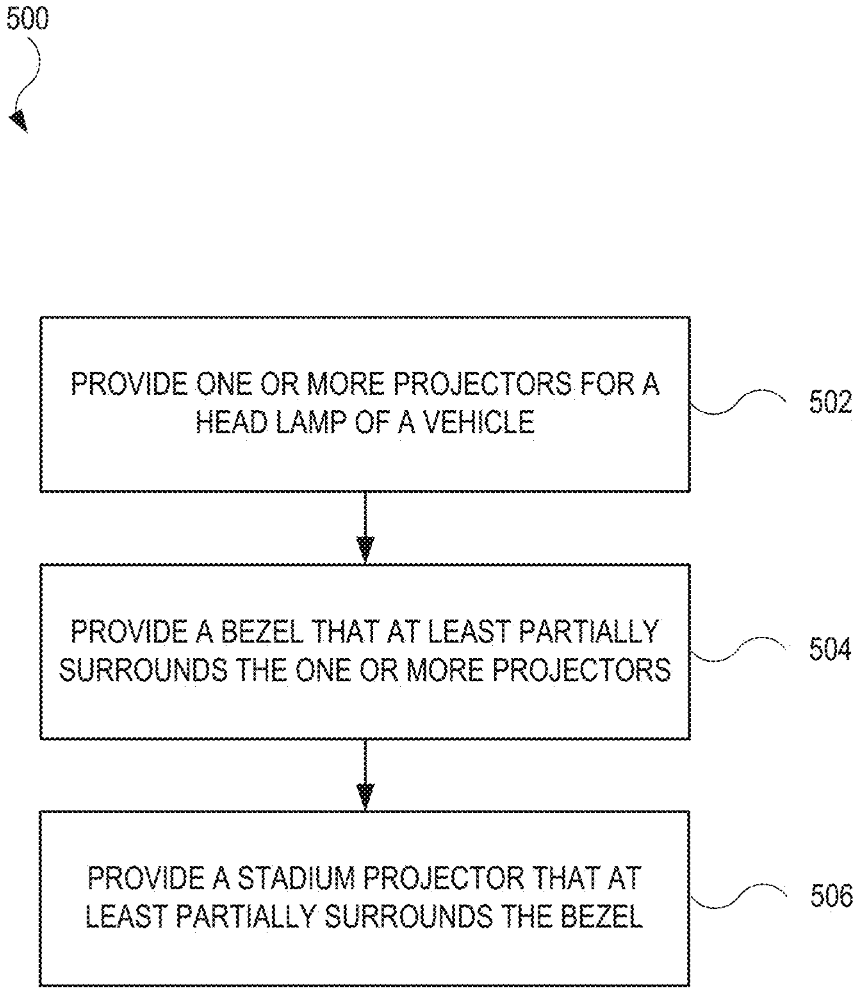

FIG. 9 and FIG. 10 illustrate flow diagrams showing exemplary processes that may be performed for assembling a head lamp, in accordance with one or more aspects of the present disclosure. For explanatory purposes, the processes primarily described herein with reference to the lamps (e.g., head lamps) shown and/or described in FIGS. 2-8 and the accompanying portions of this detailed description. However, the processes are not limited to the lamps shown and/or described in FIGS. 2-8, and one or more blocks (or operations) of the processes may be performed by one or more other components of other suitable moveable apparatuses, devices, or systems. Further for explanatory purposes, some of the blocks of the processes are described herein as occurring in serial, or linearly. However, multiple blocks of the processes may occur in parallel. In addition, the blocks of the processes need not be performed in the order shown and/or one or more blocks of the process need not be performed and/or can be replaced by other operations.

FIG. 9 illustrates a flow diagram showing an example of a process 400 that may be performed for assembling a head lamp, in accordance with one or more aspects of the present disclosure.

At block 402, a carrier is provided. The carrier may include a bezel and one or more openings, with each opening designed to receive a lens that covers a projector module. Further, the carrier may be implemented as a unitary carrier.

At block 404, a first projector module is provided and is configured to be aligned with a first opening of the carrier. The first projector module may take the form of a light source.

At block 406, a second projector module is provided and is configured to be aligned with a second opening in the carrier. The second projector module may take the form of a light source.

At block 408, a third projector module is provided and is configured to be aligned with a third opening in the carrier. The first projector module, the second projector module, and the third projector module may be surrounded by the bezel of the carrier, and the bezel is configured to be surrounded by a fourth projector module.

FIG. 10 illustrates a flow diagram showing an example of a process 500 that may be performed for assembling a head lamp, in accordance with one or more aspects of the present disclosure.

At block 502, one or more projectors are provided for a head lamp of a vehicle. The one or more projectors may each take the form of a projector module designed to provide a light source.

At block 504, a bezel is provided that at least partially surrounds the one or more projectors. The bezel may be part of a carrier designed to hold the one or more projectors.

At block 506, a stadium projector provided that may at least partially surround the bezel. The stadium projector may include an oblong shape and may define a space to receive the bezel and the one or more projectors.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa.

Headings and subheadings, if any, are used for convenience only and do not limit the subject disclosure.

What is claimed is:

1. An apparatus, comprising:

a carrier configured to hold a first projector module, a second projector module, and a third projector module for a vehicle, the carrier comprising a bezel configured to surround the first projector module, the second projector module, and the third projector module, wherein the carrier is at least partially surrounded by a fourth projector module, and the carrier is configured to move in response to a change in ride height of the vehicle;

a first lens configured to cover the first projector module;

a second lens configured to cover the second projector module; and a third lens configured to cover the third projector module, wherein:

the carrier is movable with respect to the fourth projector module, and based on movement of the carrier, the first lens, the second lens, and the third lens are movable relative to the fourth projector module.

2. The apparatus of claim 1, wherein:

the first projector module and the second projector module combine to provide a first light intensity in a first mode of operation, and the first projector module, the second projector module, and the third projector module combine to provide a second light intensity in a second mode, the second light intensity greater than the first light intensity.

3. The apparatus of claim 2, wherein:

the second projector module is positioned between the first projector module and the third projector module, and the second projector module is adjacent to the first projector module and the third projector module.

4. The apparatus of claim 1, wherein:

the carrier comprises a single-piece carrier and is configured to be positioned in a head lamp housing, and the fourth projector module at least partially surrounds the bezel, the first projector module, the second projector module, and the third projector module.

5. The apparatus of claim 1, wherein the fourth projector module extends around the first projector module, the second projector module, and the third projector module.

6. The apparatus of claim 1, wherein:

the first projector module is positioned in a first opening of the carrier, and the first opening comprises a first dimension and a second dimension, the second dimension being at least two times greater than the first dimension.

7. A head lamp, comprising:

a housing configured to receive:

a unitary carrier configured to hold a first projector module and a second projector module, and a third projector module that surrounds the first projector module and the second projector module; and a transparent cover coupled with the housing, wherein:

the transparent cover overlays the unitary carrier and the third projector module, the unitary carrier is movable with respect to the third projector module, thereby causing movement of the first projector module and the second projector module, and based on the movement of the unitary carrier, the first projector module defines an adaptive driving projector module.

8. The head lamp of claim 7, wherein:

the first projector module is positioned in a first opening of the unitary carrier, and the first opening comprises a first dimension and a second dimension, the second dimension being at least two times greater than the first dimension.

9. The head lamp of claim 8, wherein:

the second projector module is positioned in a second opening of the unitary carrier, and the second opening comprises the first dimension and the second dimension.

10. The head lamp of claim 9, wherein:

the unitary carrier comprises an oblong shape, each of the first opening and the second opening comprises a rectangular shape.

11. The head lamp of claim 7, wherein the unitary carrier is further configured to carry the third projector module.

12. The head lamp of claim 7, further comprising a bezel surrounded by the third projector module, wherein the first projector module and the second projector module align with respective openings of the bezel.

13. The head lamp of claim 7, further comprising:

a first lens configured to cover the first projector module; and a second lens configured to cover the second projector module.

14. The head lamp of claim 7, further comprising a transparent cover configured to mate with the housing.

15. A vehicle, comprising:

a head lamp, comprising:

a unitary carrier configured to hold a first projector module, a second projector module, and a third projector module, and a fourth projector module that surrounds the first projector module, the second projector module, and the third projector module; and a transparent cover that overlays the unitary carrier and the fourth projector module, wherein the unitary carrier is configured to move in response to a change in movement of the vehicle.

16. The vehicle of claim 15, wherein based on movement of the unitary carrier, the first projector module, the second projector module, and the third projector module are movable with respect to the fourth projector module.

17. The vehicle of claim 15, wherein:

the first projector module is positioned in a first opening of the carrier, the first opening comprises a first dimension and a second dimension, the second dimension being at least two times greater than the first dimension, the second projector module and the third projector module are positioned in a second opening and a third opening, respectively, of the carrier, and each of the second opening and the third opening comprises the first dimension and the second dimension.

18. The vehicle of claim 15, wherein the carrier is at least partially surrounded by the fourth projector module.

* * * * *